W. H. PARHAM.
VEHICLE TIRE FASTENER.
APPLICATION FILED JULY 27, 1920.
1,398,603. Patented Nov. 29, 1921.
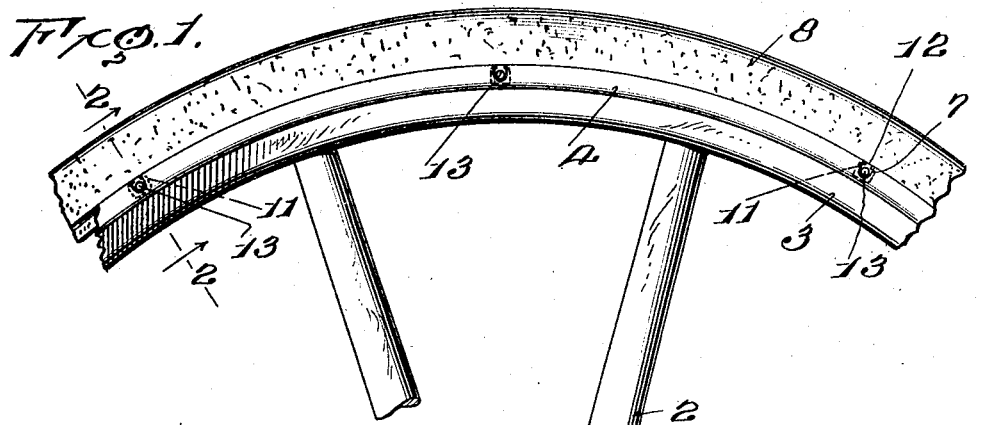
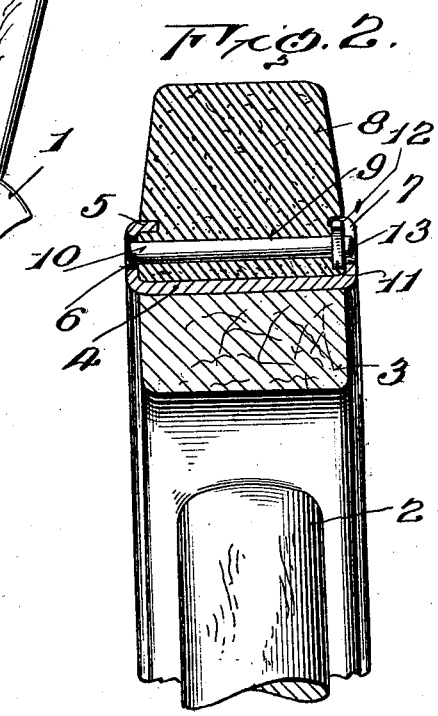
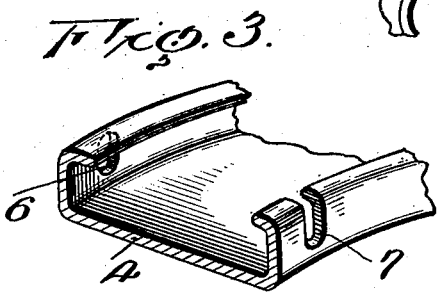
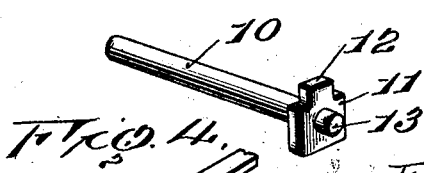
Inventor
W. H. Parham
By
Attorney

UNITED STATES PATENT OFFICE.

WILLIAM H. PARHAM, OF KNOXVILLE, TENNESSEE, ASSIGNOR TO PARHAM AUTO PATENTS CORPORATION, OF KNOXVILLE, TENNESSEE, A CORPORATION OF DELAWARE.

VEHICLE-TIRE FASTENER.

1,398,603.  Specification of Letters Patent.  Patented Nov. 29, 1921.

Application filed July 27, 1920. Serial No. 399,382.

*To all whom it may concern:*

Be it known that I, WILLIAM H. PARHAM, a citizen of the United States, residing at Knoxville, in the county of Knox and State of Tennessee, have invented certain new and useful Improvements in Vehicle-Tire Fasteners, of which the following is a specification, reference being had therein to the accompanying drawing.

This invention relates to a tire fastener and is an improvement on the tire fastener disclosed in my applications Serial Nos. 383,121 and 383,122, filed May 21, 1920, and is a companion application of applications filed July 27, 1920, bearing Serial Numbers 399,380 and 399,381, the object being to provide a fastener which will securely fasten the tire within the channel rim and at the same time prevent the same from creeping in any way on the rim.

Another object of the invention is to provide a tire fastener which is composed of a cross bar mounted within a bore formed in the base of a tire and adapted to extend into suitable openings formed in the vertical legs of the channel rim in such a manner that the fastening member is in such a position that it can be readily acted on by the instrument employed for placing the same under pressure to compress the base of the tire for allowing the tire to be inserted and removed from the rim.

Other and further objects and advantages of the invention will be hereinafter set forth and the novel features thereof defined by the appended claims.

In the drawings,

Figure 1 is a side elevation of a portion of a wheel showing the application of my improved construction of fastener;

Fig. 2 is an enlarged section taken on line 2—2 of Fig. 1.

Fig. 3 is a detail perspective view of a portion of a rim constructed in accordance with my invention;

Fig. 4 is a perspective view of one of the fastening members detached;

Fig. 5 is a detail perspective view of a slightly modified form of fastening device used in connection with the particular construction of rim shown.

In the drawing 1 indicates a hub, 2 the spokes, 3 the felly and 4 a channel rim mounted thereon. The channel rim as herein shown is provided with annular grooves in its sides formed by turning the upper edges of the legs inwardly as shown at 5, one vertical leg being provided with openings 6 and the other with notches 7 in transverse alinement. Arranged within the channel rim 4 is a resilient tire 8 having transverse bores 9 formed in its base adapted to register with the openings 6 and notches 7 and in which are slidably mounted fastening members in the form of cross bars 10. Each fastening member is provided with a member 11 adjacent one end forming an enlargement for compressing the base of the tire, said enlargement being provided with a reduced portion 12 which is adapted to fit within the notch 7 as clearly shown in Fig. 2. By forming the enlargement with reduced portions shoulders are provided which engage the overhanging portion of the rim to each side of the notch so as to prevent the tire from moving radially.

The projecting end 13 of the rod 10 also extends into the notch and the opposite end of the rod extends into the opening 6 of the channel rim. When the fastening device is in position as shown in Fig. 2, the projecting end 13 is within the notch in such a manner that a suitable instrument can be placed against the same so as to move the fastening device transversely of the tire within the bore 9 which places the base of the tire under pressure so as to compress the base in order to allow the fastening member to move out from under the overhanging portion of the channel rim. The opening 6 allows the fastening member to move outwardly therethrough when placed under pressure and by this construction a very novel fastening is formed which is so mounted that it can be readily manipulated to remove or insert the tire to a channel rim. When the tire has been placed under pressure and forced in position within the channel rim, when the pressure is released the resiliency of the tire forces the fastening device into position as shown in Fig. 2 so as to securely fasten the tire in position on the rim to prevent radial movement and as the ends of the fastening member extend into the openings and notches the tire is prevented from creeping in any way.

In the modified form of fastening device illustrated in Fig. 5 I show a channel rim having one of its vertical flanges provided with notches and the other flange with spaced openings adapted to receive the legs of substantially U-shaped fastening members A, these members being arranged in transverse bores formed in the base of the resilient tire. This construction provides a fastening device which can be readily removed by inserting an instrument through the notch of the flange and forcing the free ends of the legs of the U-shaped member out through the openings in the opposite flange so that the tire will be free to be forced out of the channel rim.

From the foregoing description it will be seen that I have provided a tire fastener formed of a cross bar having an enlargement at one end in connection with a channel rim having oppositely disposed notches and openings to receive the ends of the fastening device whereby the fastening device is in a position to be acted on by an instrument for inserting or removing the tire and when the tire is in position, the fastening device is arranged within the openings and notches so as to securely fasten the tire on the rim.

I am aware that various modifications of construction of fastening device illustrated in this application can be employed without departing from the spirit of my invention as claimed.

What I claim is:—

1. In a tire fastener, the combination with a channel rim provided with annular grooves in its vertical legs, one leg being provided with a series of openings and the other with a series of notches in transverse alinement with said openings, of a resilient tire arranged within said rim having transversely arranged bores in transverse alinement with said openings and notches and fastening devices slidably mounted in said bores having their ends normally held within the notches and openings of said rim by the resiliency of said tire.

2. In a tire fastener, the combination with a channel rim provided with annular grooves in its vertical legs, said vertical legs being provided with openings and notches, of a resilient tire mounted within said rim, and fastening devices slidably mounted in said tire normally held within the grooves and openings of said rim by the resiliency of said tire.

3. In a tire fastener, the combination with a channel rim provided with annular grooves in its vertical legs, one of the legs being provided with a series of openings and the other with a series of notches, of a resilient tire mounted in said rim having transversely arranged bores in alinement with said openings and notches, and a bar mounted in each of said bores having an enlargement at one end thereof, said bars having their ends normally held within the openings and notches of said rim by the resiliency of said tire.

4. In a tire fastener, the combination with a channel rim having a plurality of openings in one of the vertical legs thereof and a plurality of notches in the other vertical leg, of a resilient tire mounted in said rim, fastening devices slidably mounted within said tire having members at one end for engaging the base of the tire and reduced portions extending into the notches of said rim, said fastening devices being normally held in locked position by the resiliency of the tire.

5. In a tire fastener, the combination with a channel rim provided with openings in its vertical legs, of a resilient tire mounted in said rim having transversely arranged bores, and fastening devices slidably mounted within said bores having their ends extended into the openings of said rim, said fastening devices having enlargements at one end engaged by the base of the tire for normally holding said fastening devices in locked position.

In testimony whereof I have hereunto affixed my signature in the presence of two witnesses.

WILLIAM H. PARHAM.

Witnesses:
 WM. A. A. JOHNSTON,
 JOSEPH D. TRUAN.